C. H. DANA.
Potato-Digger.
No. 10,926.
Patented May 16, 1854.
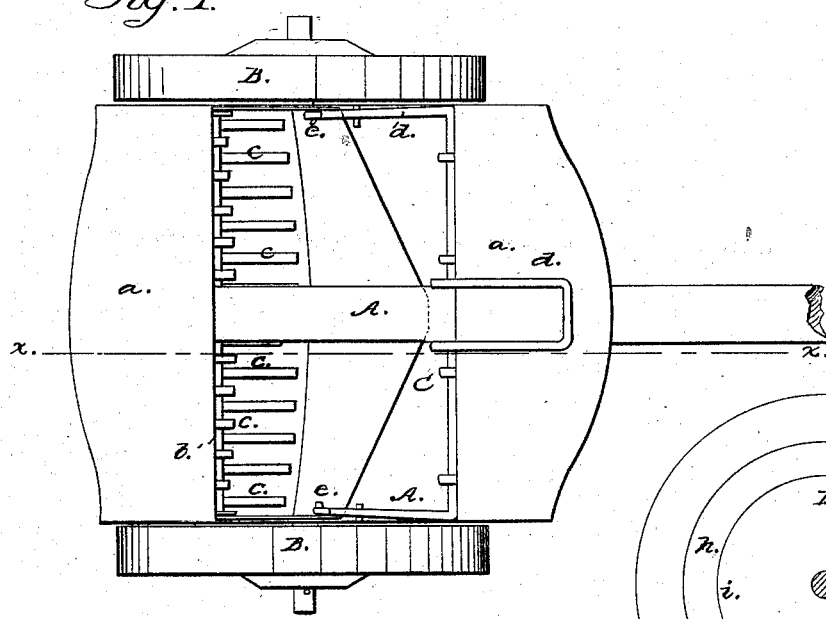
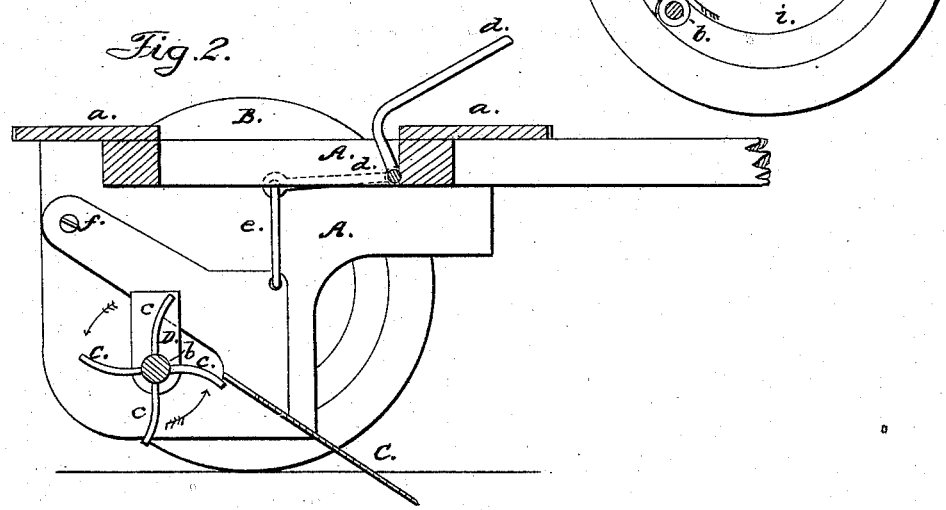

UNITED STATES PATENT OFFICE.

CHARLES H. DANA, OF WEST LEBANON, NEW HAMPSHIRE.

IMPROVEMENT IN POTATO-DIGGERS.

Specification forming part of Letters Patent No. 10,926, dated May 16, 1854.

*To all whom it may concern:*

Be it known that I, CHARLES H. DANA, of West Lebanon, in the county of Grafton and State of New Hampshire, have invented a new and Improved Machine for Digging Potatoes; and I do hereby declare that the following is a full and exact description thereof, reference being had to the accompanying drawings, making part of this specification—

Figure 1 being a top view of the machine; Fig. 2, a longitudinal vertical section thereof in the line $x\ x$ of Fig. 1, and Fig. 3 a view of a part detached.

Like letters designate corresponding parts in all the figures.

The nature of my invention consists in the use of a revolving separator, D, for the purpose of breaking up the raised furrow-slice and separating the potatoes therefrom, constructed and operating substantially as hereinafter set forth.

A suitable frame, A, is constructed to be borne by two wheels, B B, and drawn by means of a pole or tongue in the ordinary way.

A share-blade or scoop, C, of any convenient and suitable construction, hinged to the frame at $f$, Fig. 2, is employed to plow up the potatoes, together with the earth above and among them, and thus raise them in a continuous slice through each row. Said scoop is adjusted to a proper depth in the ground when operating, or raised entirely above the ground when not in action, by means of suitable levers and rods, $d\ e$, or any equivalent device, to be controlled by the driver standing upon a platform, $a$, above the frame of the machine.

Directly behind the rear and upper edge of the scoop C is situated a roller, $b$, extending transversely across the machine and turning in suitable bearings in the frame. Said roller is pierced at distances of an inch or two by metallic rods or fingers $c\ c$, &c., alternately at right angles to one another, and of such a length that they will project a few inches from four (or more) sides of the roller, as represented in the drawings. These fingers collectively, with their roller or shaft $b$, form a revolving separator, D, which is to turn in the direction indicated by the arrow in Fig. 2, and over it the furrow-slice containing the potatoes is to pass after being raised by the scoop C. The fingers $c\ c$, &c., may be more or less curved backward from the direction in which they revolve, as shown in Fig. 2, in order that they may not collect and become loaded or tangled by weeds, turf, stones, &c., and may move with less resistance.

The separator is driven by means of a friction-pulley, $g$, Fig. 3, attached to its shaft $b$, and moving in a concentric annular groove, $h$, on the inner face of one or both of the wheels B B, and pressing against the inner side, $i$, of said groove, or by means of a pinion on said shaft $b$, gearing into a cog-wheel properly situated on one of the wheels.

The furrow-slice containing the potatoes, after leaving the scoop C, is caught upon the teeth of the separator D, which, revolving with considerable velocity, break it up and roll back the potatoes upon the ground behind, while the dirt falls through between the fingers $c\ c$, &c. Thus the potatoes are perfectly separated from the dirt, and left free on the surface of the ground. I find this to be a completely effectual means of separating the potatoes from the earth, and that it entirely obviates all the difficulties heretofore found insuperable when an endless belt or a vibrating screen has been used.

What I claim as my invention, and desire to secure by Letters Patent, is—

The revolving separator D, constructed and operating substantially as described, for the purpose of breaking up the raised furrow-slice and separating the potatoes therefrom.

The above specification of my new and improved machine for digging potatoes signed by me this 16th day of January, 1854.

C. H. DANA.

Witnesses:
 N. B. EDMINSTER,
 GIDEON DICKINSON.